(12) United States Patent  
Sumigama et al.

(10) Patent No.: US 12,106,951 B2  
(45) Date of Patent: Oct. 1, 2024

(54) MASS ANALYSIS SYSTEM, AND METHOD FOR DETERMINING PERFORMANCE OF MASS ANALYSIS DEVICE

(71) Applicant: HITACHI HIGH-TECH CORPORATION, Tokyo (JP)

(72) Inventors: Yuka Sumigama, Tokyo (JP); Yuichiro Hashimoto, Tokyo (JP); Hiroyuki Yasuda, Tokyo (JP); Masuyuki Sugiyama, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 398 days.

(21) Appl. No.: 17/599,231

(22) PCT Filed: Mar. 12, 2020

(86) PCT No.: PCT/JP2020/010709  
§ 371 (c)(1),  
(2) Date: Sep. 28, 2021

(87) PCT Pub. No.: WO2020/203134  
PCT Pub. Date: Oct. 8, 2020

(65) Prior Publication Data  
US 2022/0189755 A1 Jun. 16, 2022

(30) Foreign Application Priority Data  
Apr. 5, 2019 (JP) .................................. 2019-072798

(51) Int. Cl.  
*H01J 49/00* (2006.01)  
*G01N 27/62* (2021.01)  
*H01J 49/10* (2006.01)

(52) U.S. Cl.  
CPC .......... *H01J 49/0036* (2013.01); *G01N 27/62* (2013.01); *H01J 49/0009* (2013.01); *H01J 49/10* (2013.01)

(58) Field of Classification Search  
CPC .... H01J 49/0036; H01J 49/0009; H01J 49/10; G01N 27/62  
See application file for complete search history.

(56) References Cited

U.S. PATENT DOCUMENTS 6,265,714 B1 * 7/2001 Shimomura .......... H01J 49/025  
    250/397  
2014/0264007 A1 * 9/2014 Remes ................ H01J 49/0031  
    250/288

(Continued)

FOREIGN PATENT DOCUMENTS

JP    2000-057990 A    2/2000  
JP    2016-085817 A    5/2016  
(Continued)

OTHER PUBLICATIONS

Extended European Search Report issued on Nov. 22, 2022 for European Patent Application No. 20782302.2.  
(Continued)

*Primary Examiner* — David E Smith  
(74) *Attorney, Agent, or Firm* — Volpe Koenig

(57) ABSTRACT

Provided is a technique for accurately determining a performance of a single detector that detects ions having passed through a mass analysis unit. A mass analysis system according to the present disclosure includes, in a mass analysis device, a first converter configured to calculate a first measured value based on an intensity and an area of a pulse in an electric signal output from the detector configured to detect the ions having passed through the mass analysis unit, a second converter configured to obtain a second measured value by counting the number of pulses of the electric signal, (Continued)

a calculation unit configured to calculate an A/P ratio indicating a ratio of the first measured value to the second measured value, a determination unit configured to determine a performance of the detector based on a value of the A/P ratio, and a control unit configured to control at least an output of a determination result obtained by the determination unit.

9 Claims, 8 Drawing Sheets

(56) References Cited

U.S. PATENT DOCUMENTS

| | | | | |
|---|---|---|---|---|
| 2015/0048245 | A1* | 2/2015 | Vestal | H01J 49/403 250/282 |
| 2015/0162174 | A1* | 6/2015 | Badiei | H01J 49/0009 250/288 |
| 2016/0195466 | A1* | 7/2016 | Loboda | G01N 15/1023 435/7.1 |
| 2017/0025265 | A1 | 1/2017 | Verenchikov et al. | |

FOREIGN PATENT DOCUMENTS

| | | |
|---|---|---|
| JP | 2017-513196 A | 5/2017 |
| JP | 2017-191739 A | 10/2017 |
| WO | 2016/109603 A1 | 7/2016 |

OTHER PUBLICATIONS

Japanese Office Action issued on Sep. 12, 2023 for Japanese Patent Application No. 2021-511344.
Chinese Office Action issued on Sep. 28, 2023 for Chinese Patent Application No. 202080026023.3.
International Search Report, PCT/JP2020/010709, Mar. 12, 2020 (5 pgs.).

* cited by examiner

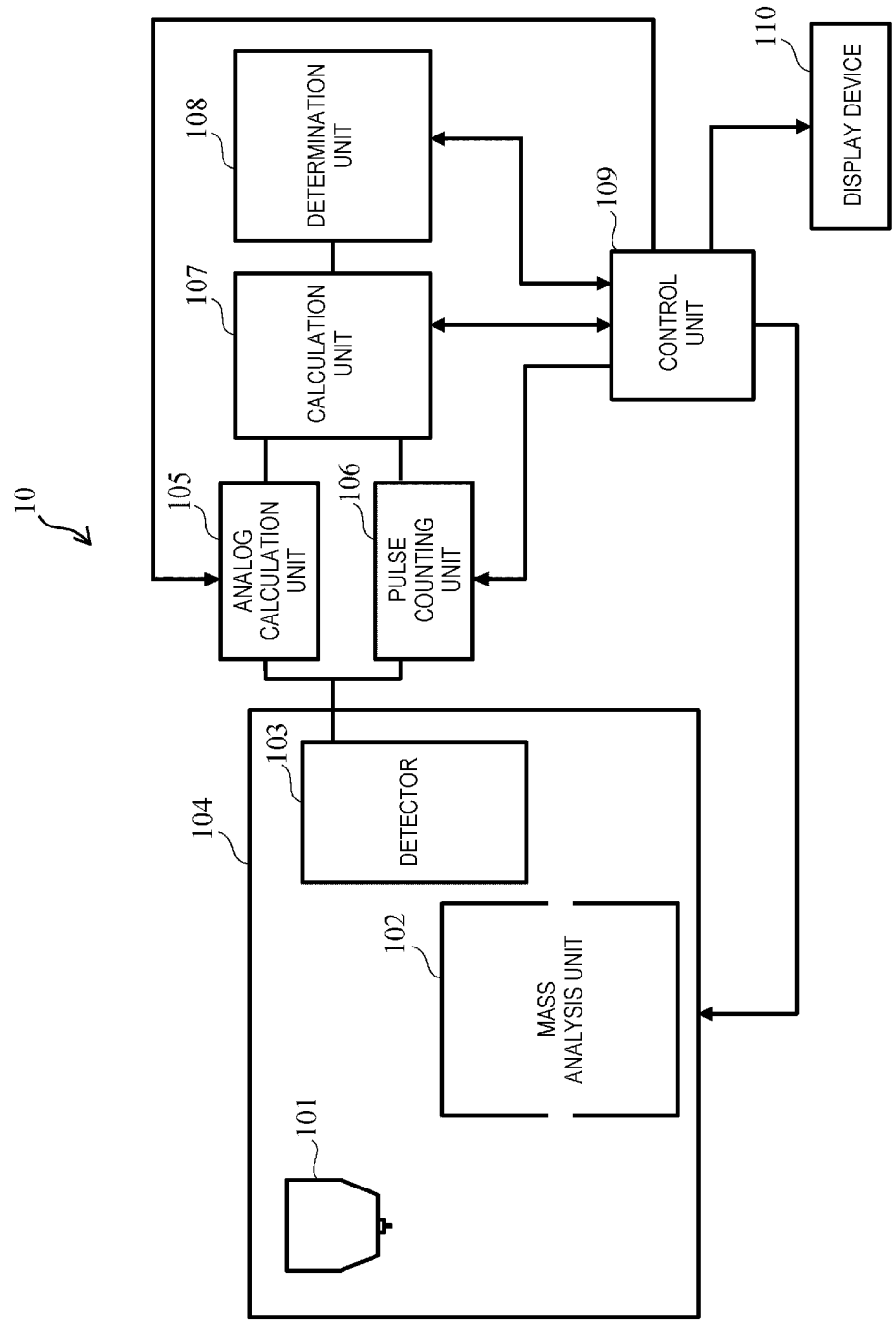
[FIG. 1]

[FIG. 2]
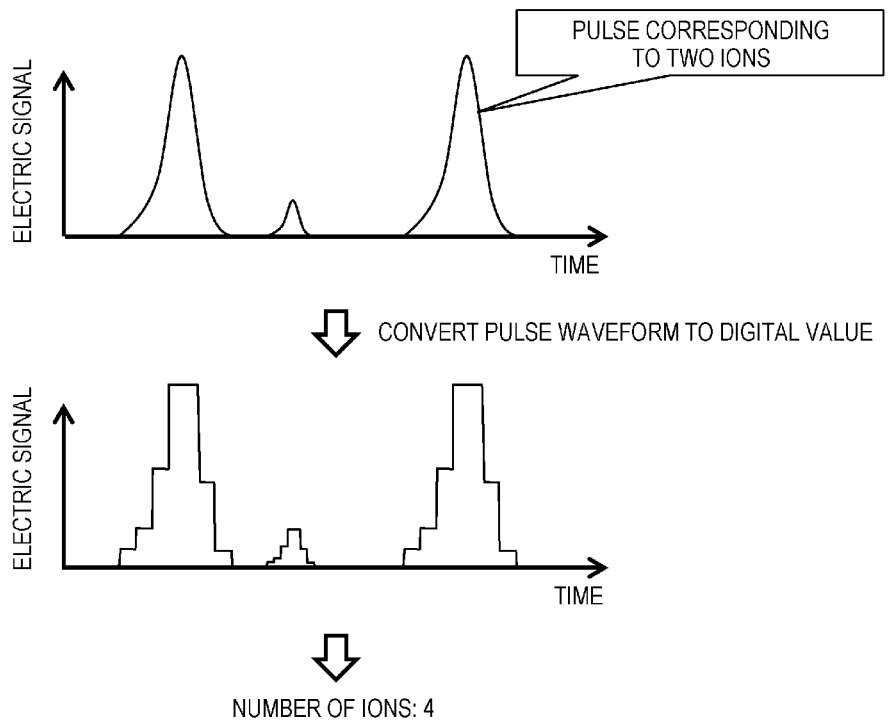
[FIG. 3]
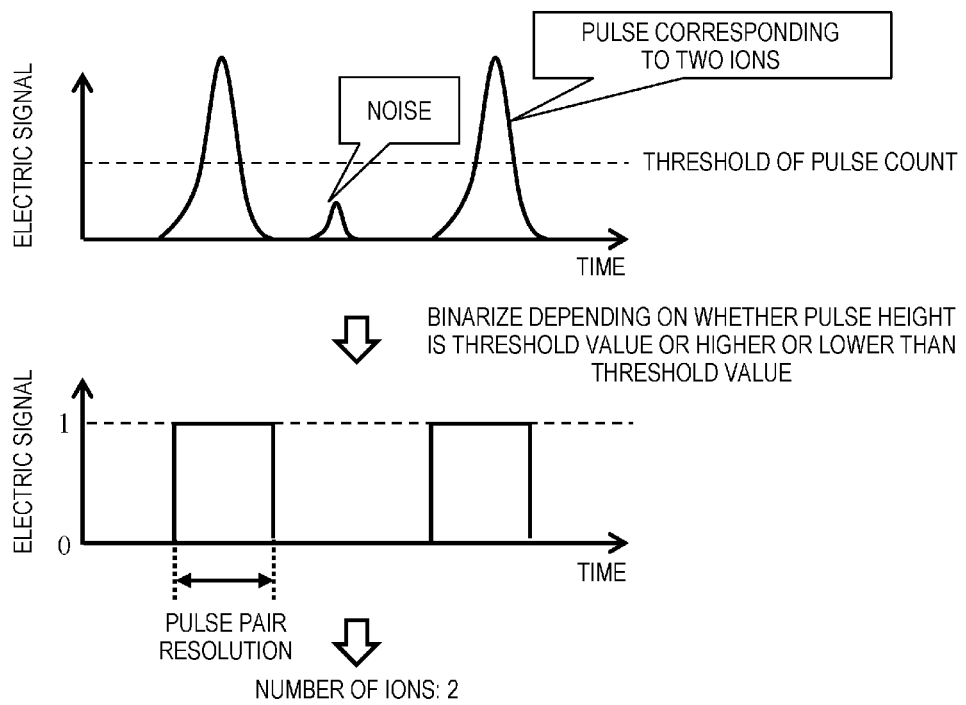

[FIG. 4]
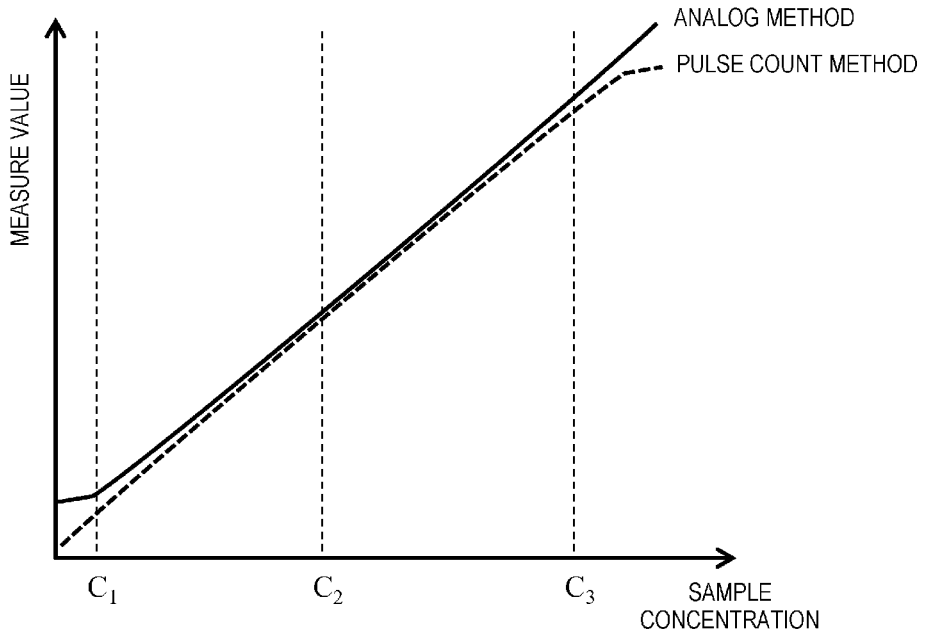
[FIG. 5]
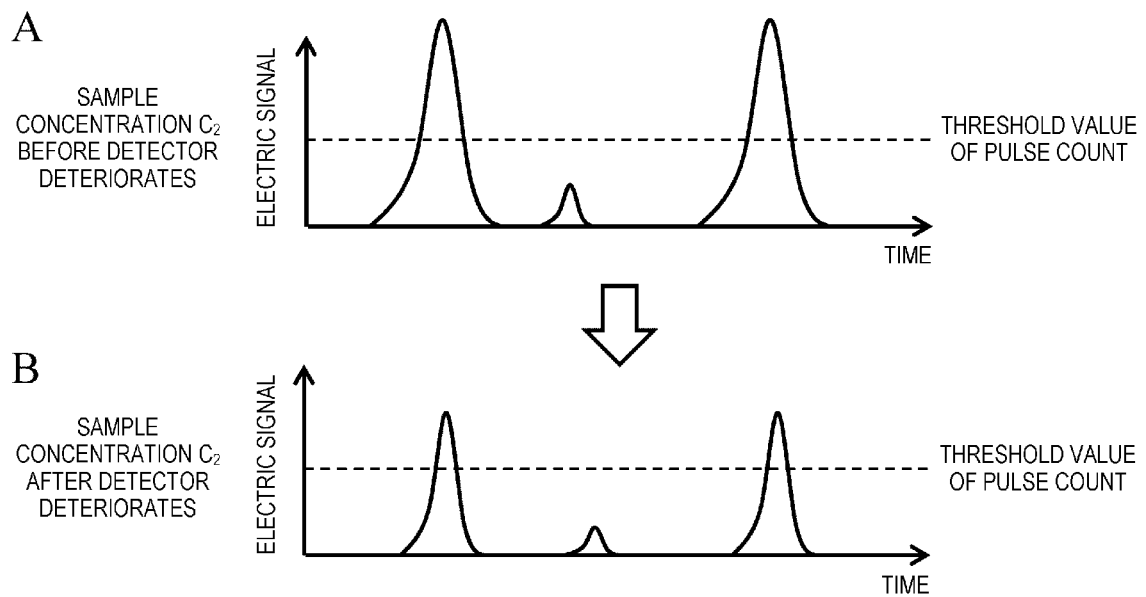

[FIG. 6]
MEASURED VALUE AND A/P RATIO WHEN SAMPLE HAVING CONCENTRATION C IS MEASURED
| No. | DETERIORATION OF DETECTOR | CONTAMINATION OF DEVICE | VALUE OBTAINED BY MEASUREMENT ||||  A/P RATIO |
| | | | PULSE COUNT METHOD || ANALOG METHOD || |
| | | | NUMBER OF PULSE | MEASURED VALUE | PULSE AREA | MEASURED VALUE | |
| 1 | NO  | NO  | 2 | 2 | 200 | 2   | 1   |
| 2 | YES | NO  | 2 | 2 | 100 | 1   | 0.5 |
| 3 | NO  | YES | 1 | 1 | 100 | 1   | 1   |
| 4 | YES | YES | 1 | 1 | 50  | 0.5 | 0.5 |
[FIG. 7]
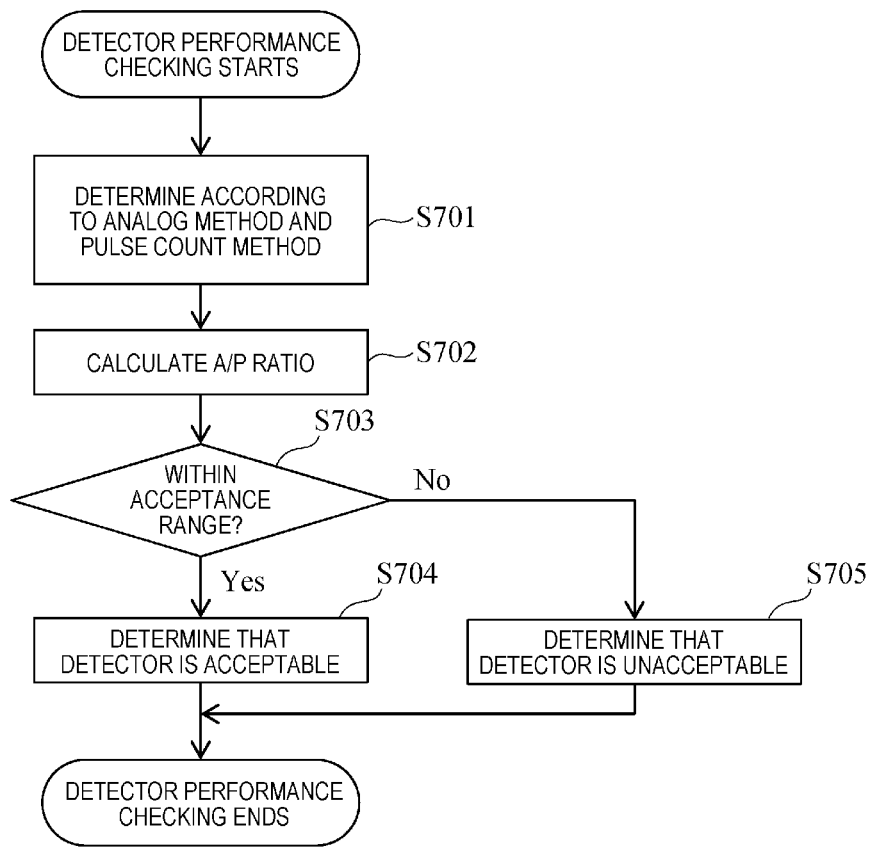

[FIG. 8]
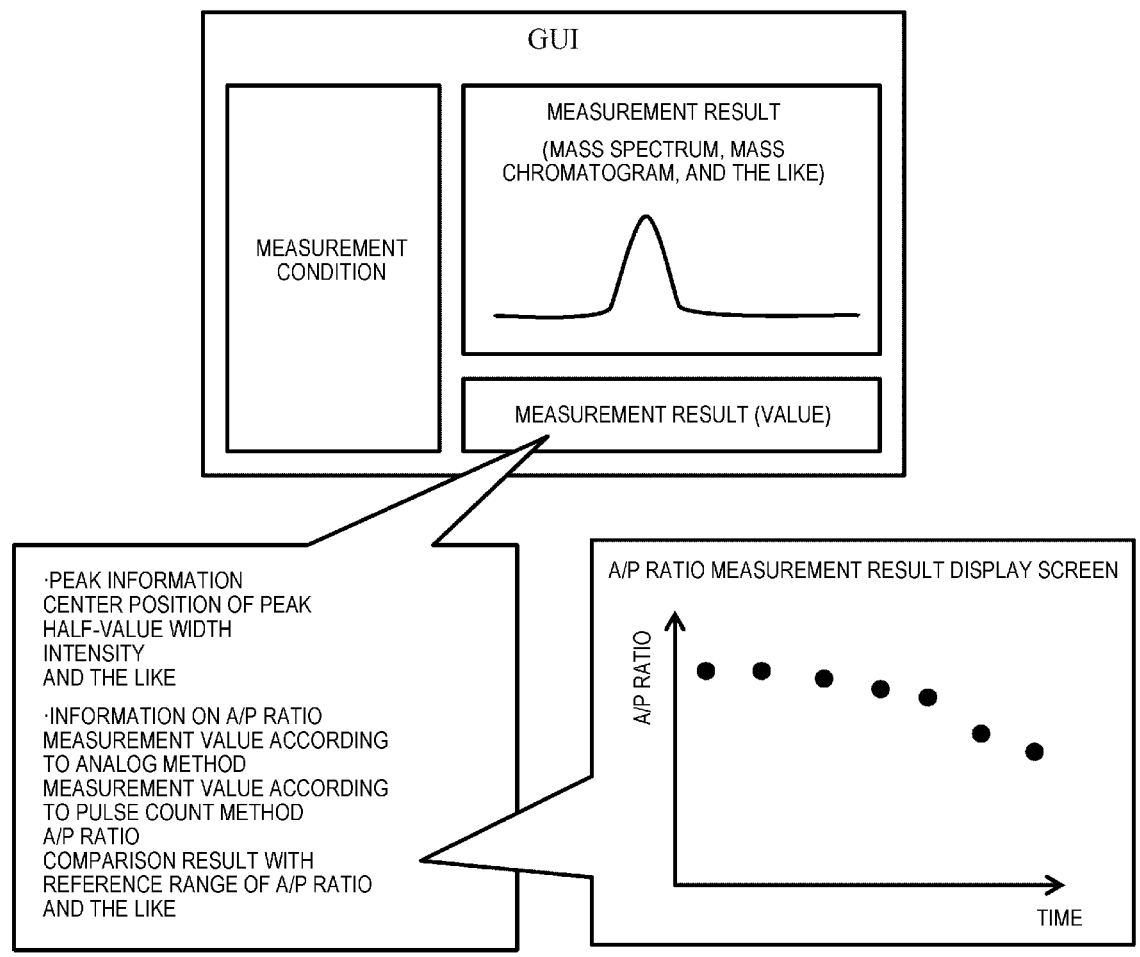

[FIG. 9]
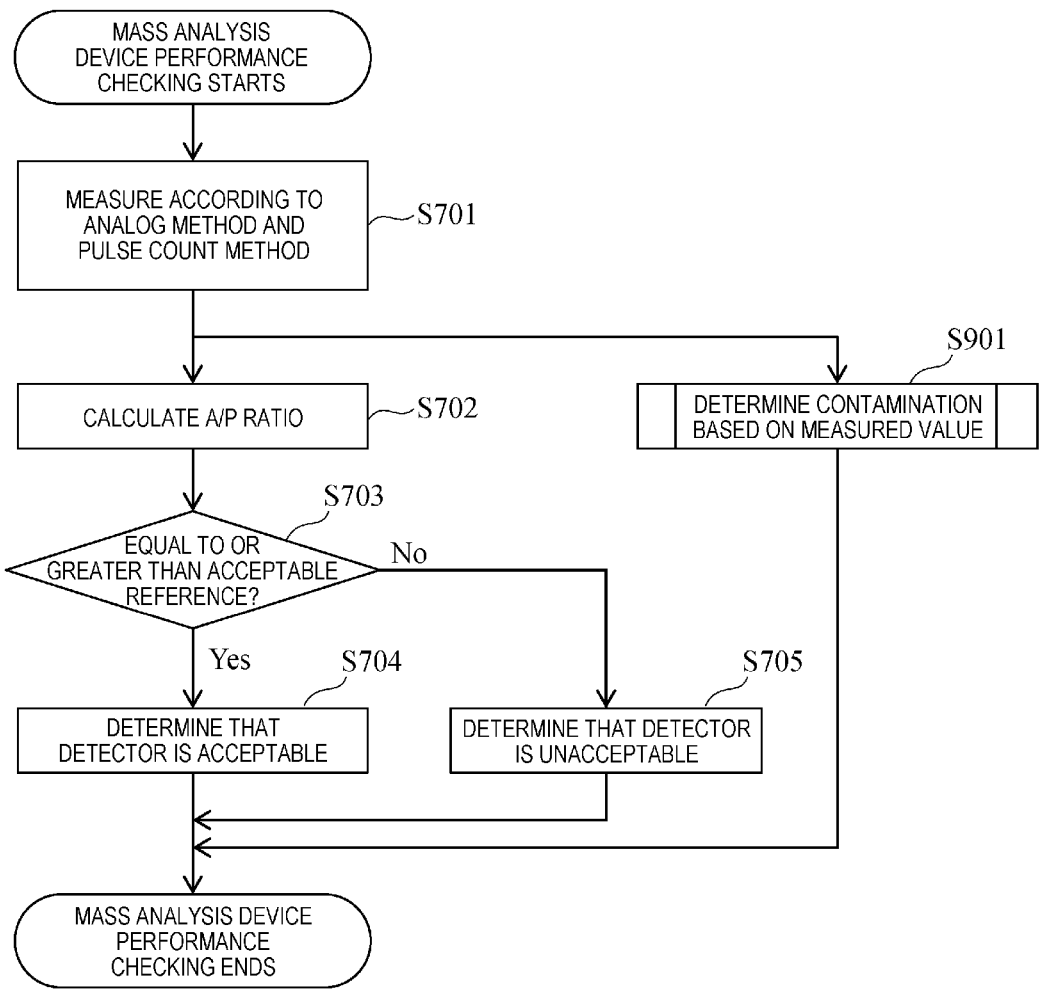

[FIG. 10]
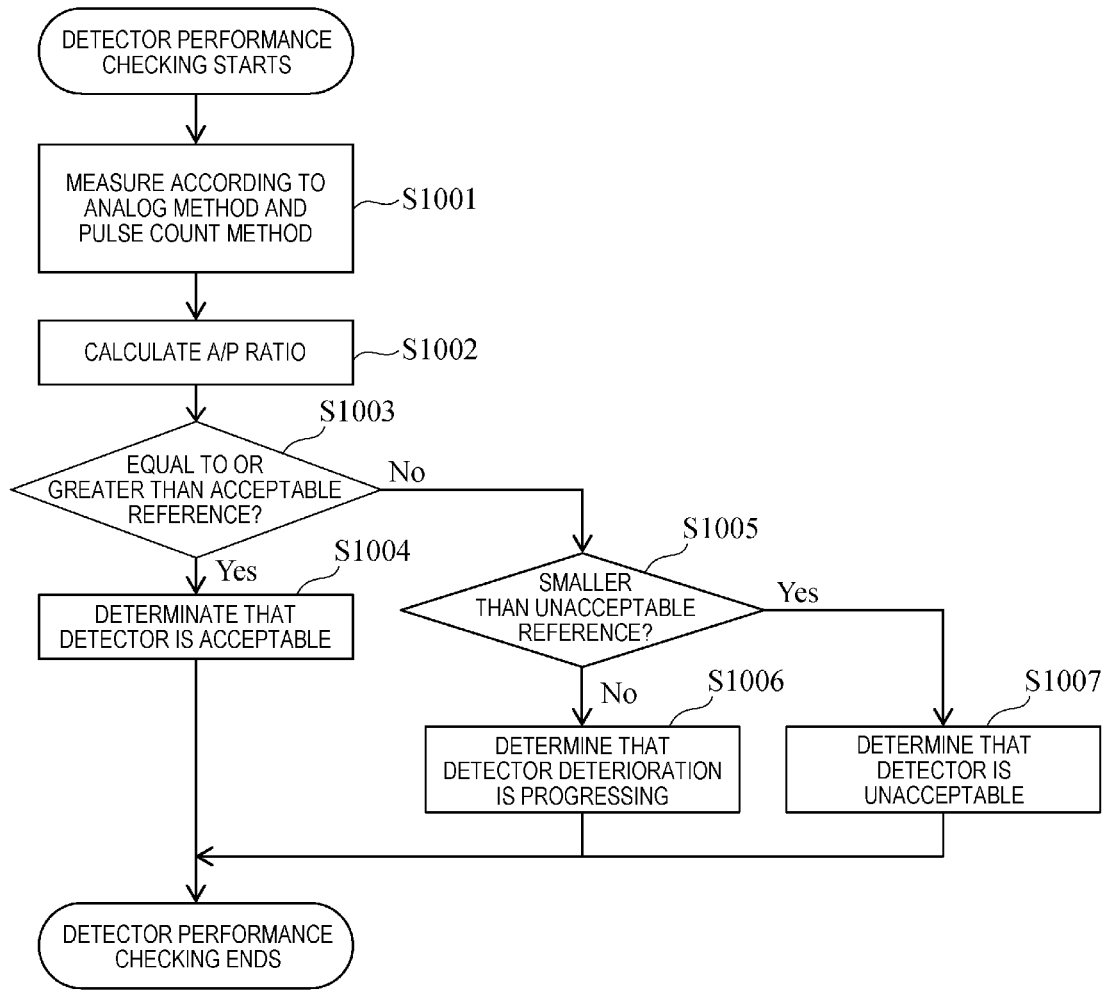

[FIG. 11]
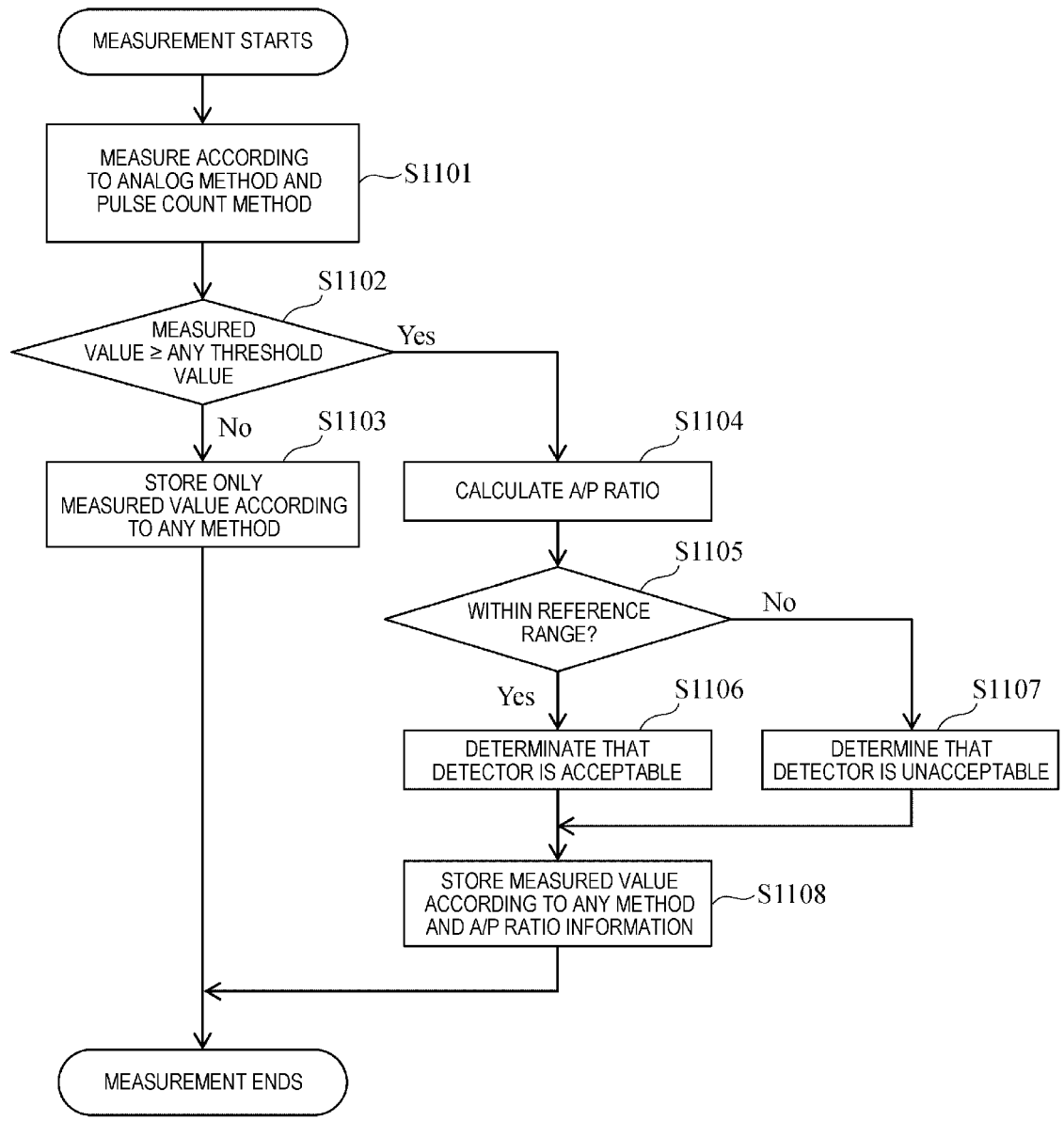

MASS ANALYSIS SYSTEM, AND METHOD FOR DETERMINING PERFORMANCE OF MASS ANALYSIS DEVICE

TECHNICAL FIELD

The present disclosure relates to a mass analysis system and a method for determining a performance of a mass analysis device.

BACKGROUND ART

A mass analysis device is a device for ionizing a sample and analyzing ions according to a mass-to-charge ratio. In general, a mass analysis device includes an ion source that ionizes a sample, a mass analysis unit that separates ions according to a mass-to-charge ratio, and a detection unit that detects the number of ions that have passed through the mass analysis unit.

The detection unit is formed using an electron multiplier tube or a photoelectron multiplier tube. The multiplier tubes generally include a plurality of dynodes and anodes. The electron multiplier tube causes charged particles to collide with a first dynode and converts the charged particles into electrons, the photoelectron multiplier tube causes photons to collide with the first dynode and converts the photons into electrons, and the generated electrons are amplified by the subsequent dynode. The present number of particles to be measured can be measured by collecting the amplified electrons in the anode and measuring a current or a voltage value of the amplified electrons. In general, the electron multiplier tube includes dynodes exposed (not sealed), but the photoelectron multiplier tube includes components sealed in a vacuum tube. Therefore, the electron multiplier tube has a shorter life than the photoelectron multiplier tube. This is because the electron multiplier tube deteriorates due to collision or contamination of the charged particles. On the other hand, the photoelectron multiplier tube has a longer life than the electron multiplier tube. However, when a photoelectron multiplier tube is used, it is necessary to use a scintillator in combination in order to convert ions into photons. The scintillator is a generic term for substances that emit fluorescence when particles collide with one another. For example, substances of various forms such as an organic crystal, an organic liquid, and an inorganic crystal are used for the scintillator. Since the scintillator is exposed (not sealed) similarly to the electron multiplier tube, the scintillator deteriorates for a similar reason as the electron multiplier tube. As described above, when the detector deteriorates, a measurement intensity decreases, which greatly affects the performance of the mass analysis device. When the detector deteriorates, it is necessary to recover the performance according to, for example, a method of adjusting a gain of the electron multiplier tube or the photoelectron multiplier tube, replacing the detector with a new detector, or the like.

However, since a decrease in the measurement intensity is often caused by contamination of other portions of the device, whether the detector has deteriorated cannot be determined only by the decrease in the measurement intensity. In order to determine whether the detector has deteriorated, it is necessary to remove the detector from the mass analysis device and determine whether the detector has deteriorated by, for example, observation with a microscope. Since it takes time and a complicated operation to remove and examine the detector in this manner, it is necessary to provide a method and a reference for determining a performance of the detector quickly and easily.

As a technique for determining the performance of the detector quickly and easily, for example, PTL 1 describes that whether a decrease in an output signal intensity is caused by the deterioration of the detector itself is appropriately determined by examining a deviation/intensity ratio of an output signal.

CITATION LIST

Patent Literature

PTL 1: JP-A-2000-57990

SUMMARY OF INVENTION

Technical Problem

However, even when the technique described in PTL 1 is used, in a case in which contamination of a part of the mass analysis device other than the detector and contamination (deterioration) of the detector are combined, which deterioration is caused cannot be determined, and the deterioration of the detector may be missed. Since fluctuation may not occur in a state in which dirt is saturated, it may be erroneously determined that the detector deteriorates.

The present disclosure has been made in view of such a situation, and provides a technique for determining deterioration of a detector alone in a mass analysis device.

Solution to Problem

In order to solve the above problems, a mass analysis system according to the present disclosure includes:

a mass analysis device including an ion source configured to ionize a measurement sample, a mass analysis unit configured to analyze ions generated by the ion source in accordance with a mass-to-charge ratio, and a detector configured to detect ions having passed through the mass analysis unit;

a first converter configured to calculate a first measured value based on an intensity and an area of a pulse in an electric signal output from the detector;

a second converter configured to obtain a second measured value by counting the number of pulses of the electric signal;

a calculation unit configured to calculate an A/P ratio indicating a ratio of the first measured value to the second measured value;

a determination unit configured to determine a performance of the detector based on a value of the A/P ratio; and a control unit configured to control at least an output of a determination result obtained by the determination unit.

More features relevant to the present disclosure will become apparent based on a description of the description and the accompanying drawings. Aspects of the present disclosure may be achieved and implemented by means of the elements and combinations of various elements and the following detailed description and accompanying claims.

Descriptions in this specification are merely exemplary, and are not intended to limit the scope of the claims or application of the present disclosure in any sense.

Advantageous Effect

According to the present disclosure, the performance of the detector of the mass analysis device can be accurately and quickly determined regardless of presence or absence of dirt in a part other than the detector.

BRIEF DESCRIPTION OF DRAWINGS

FIG. 1 is a diagram showing a schematic configuration example of a mass analysis system according to an embodiment (common in embodiments).

FIG. 2 is a diagram showing an example of signal processing according to an analog method.

FIG. 3 is a diagram showing an example of signal processing according to a pulse count method.

FIG. 4 is a diagram showing a relationship between a sample concentration and a measured value.

FIG. 5 is a diagram showing an example of a waveform in a case in which a detector 103 deteriorates.

FIG. 6 is a table showing a relationship between a measured value and an A/P ratio when a sample having a concentration C is measured.

FIG. 7 is an example of a flowchart showing processing of determining a performance (presence or absence of deterioration) of the detector 103 in a mass analysis system 10 in FIG. 2.

FIG. 8 is a diagram showing an example of a GUI result display screen.

FIG. 9 is an example of a flowchart showing performance determination processing (performance checking processing) of a mass analysis device according to a second embodiment.

FIG. 10 is an example of a flowchart showing performance determination processing (performance checking processing) of the detector 103 according to a third embodiment.

FIG. 11 is an example of a flowchart showing A/P ratio and measured value collection processing according to a fourth embodiment.

DESCRIPTION OF EMBODIMENTS

Embodiments of the present disclosure will be described below with reference to the accompanying drawings. In the accompanying drawings, functionally the same element may be displayed with the same number. The accompanying drawings show specific embodiments and implementation examples consistent with principles of the present disclosure, are for the understanding of the present disclosure, and are not intended to construe the present disclosure in a limiting sense.

It is necessary to understand that the present embodiment is described in sufficient detail for those skilled in the art to perform the present disclosure, but other implementations and aspects are possible, and the configuration and the structure can be changed and various elements can be replaced without departing from the scope and the spirit of the technical idea of the present disclosure. Therefore, the following description should not be construed as being limited to the present embodiment.

Although in the following description, the measured value and the A/P ratio in the present embodiment will be described in the form of a "table", the measured value and the A/P ratio may not necessarily be expressed by a data structure based on a table, and may be expressed by a data structure such as a list, a DB, or a queue, or other data structures. Therefore, the "table", the "list", the "DB", the "queue", and the like can be simply referred to as "information" in order to indicate that the measured value and the A/P ratio do not depend on the data structure.

(1) First Embodiment

<Correction of Mass Analysis Device>

FIG. 1 is a diagram showing a schematic configuration example of a mass analysis system 10 according to an embodiment. As shown in FIG. 1, the mass analysis system 10 includes a mass analysis device 104 including an ion source 101 that ionizes a measurement sample, a mass analysis unit 102 that analyzes ions generated by the ion source 101 in accordance with a mass-to-charge ratio, and a detector 103 that detects ions having passed through the mass analysis unit 102, an analog calculation unit (first converter) 105 that calculates a measured value based on an intensity and an area of a pulse in an electric signal output from the detector 103, a pulse counting unit (second converter) 106 that counts the number of pulses of the electrical signal output from the detector 103 to obtain a measured value, a calculation unit 107 that calculates a ratio (A/P ratio) between the measured value obtained from the pulse counting unit 106 and the measured value obtained by the analog calculation unit 105, a determination unit 108 that determines a performance of the detector 103 based on the A/P ratio, a control unit (controller) 109 that controls an operation of each component, and a display device 110 that displays an A/P ratio, a determination result, and the like on a GUI.

The ion source 101 ionizes a measurement sample (target sample) supplied by, for example, a syringe or a liquid chromatograph according to various chemical and physical techniques. Examples of the ionization method include an electron ionization method, a chemical ionization method, an electrospray ionization method, an atmospheric pressure chemical ionization method, and a matrix-assisted laser desorption ionization method. There is also a method of performing ionization using plasma as in an inductively coupled plasma mass analysis device.

The measurement sample ionized by the ion source 101 is taken into the mass analysis unit 102 by chemical or physical action. For example, an ionized measurement sample is taken in by applying an appropriate voltage to an electrode provided in the vicinity of an ion inlet of the mass analysis unit 102. Then, the ions taken into the mass analysis unit 102 are electrically and magnetically separated according to the mass-to-charge ratio. For example, there are a magnetic field type in which an orbit of ions is bent by a magnetic field, a quadrupole type in which ions are separated by applying a high-frequency AC voltage and a DC voltage to an electrode processed such that a cross section is a bipolar plane, a time-of-flight type in which a time of flight of ions is detected, and the like.

The ions separated by the mass analysis unit 102 are finally detected by the detector 103. In general, an electron multiplier tube or a photoelectron multiplier tube is used as the detector 103 of the mass analysis device 104. The electron multiplier tube is a multiplier tube that converts charged particles into electrons and amplifies the electrons, and the photoelectron multiplier tube is a multiplier tube that converts photons into electrons and amplifies the electrons. When a photoelectron multiplier tube is used, charged particles are often converted into photons via a scintillator. The charged particles described herein may be ions that have passed through the mass analysis unit 102, or may be particles generated by causing ions that have passed through the mass analysis unit 102 to collide with a conversion dynode.

The electrons amplified by the detector 103 can be detected as an electric signal (current or voltage). As a method of processing the electric signal, there are a pulse count method and an analog method. In the present embodiment, a component having a processing function according to the analog method is referred to as the analog calculation unit (first converter) 105, and a component having a processing function according to the pulse count method is referred to as a pulse counting unit (second converter) 106. Both the analog calculation unit (first converter) 105 and the pulse counting unit (second converter) 106 are connected to the detector 103, and are capable of processing at the same time.

In the analog method, the present number of ions is obtained by calculating the intensity and the area of pulses detected during a certain period of time. FIG. 2 is a diagram showing an example of signal processing according to an analog method. First, the analog calculation unit (first converter) 105 reads a height or an area of a pulse appearing in a waveform diagram in which a horizontal axis represents time and a vertical axis represents an electric signal. The height and the area are calculated by, for example, converting a pulse, which is an analog waveform, into a digital waveform by an analog/digital converter (ADC), and reading or integrating the values. Then, the calculation unit 107 calculates the number of ions by dividing the calculated intensity or area by the intensity or the area per one ion to be measured obtained in advance.

In the pulse count method, the present number of ions is obtained by counting the number of pulses detected during a certain period of time. FIG. 3 is a diagram showing an example of signal processing according to a pulse count method. The pulse counting unit (second converter) 106 processes a pulse equal to or greater than a predetermined threshold value as "1" and a pulse less than the threshold value as "0" among pulses appearing in a waveform diagram in which the horizontal axis represents time and the vertical axis represents an electrical signal (current value or potential difference), thereby counting how many pulses appear during the certain period of time. The pulse count unit (second converter) 106 may have a function of signal amplification processing by an amplifier, noise removal, or the like before and after a series of processing or in the middle of the series of processing.

The analog calculation unit (first converter) 105 may have a function of signal amplification processing by an amplifier, noise removal, or the like before and after the series of processing or in the middle of the series of processing. The analog calculation unit (first converter) 105 may include an amplifier shared with the pulse counting unit (second converter) 106 and the like.

<Relationship Between Sample Concentration and Measured Value>

FIG. 4 is a diagram showing a relationship between the sample concentration and the measured value. Since a current amount is small when the sample concentration is low (concentration $C_1$ or less), the measurement according to the analog method is impossible or is measurement in which an S/N ratio is poor. In FIG. 4, it can be seen that when the concentration is lower than the concentration $C_1$, a shape of a measurement characteristic according to the analog method is dull due to the deterioration of the S/N ratio.

When the concentration is higher than $C_1$, a region in which measurement according to both the analog method and the pulse count method can be performed is obtained (for example, a concentration $C_2$).

When the concentration is further increased (concentration $C_3$ or higher), the ions reach the detector 103 at a high frequency, and thus the number of ions exceeds a limit value of the number of ions counted according to the pulse count method. That is, when an occurrence frequency (a time interval between adjacent pulses) of pulses is smaller than a width of a digital clock, the number of pulses cannot be appropriately counted, and thus a specific shape of measurement according to the pulse count method is dull (a measured value is saturated).

As shown in FIG. 4, when a ratio between a measured value according to the analog method and a measured value according to the pulse count method is defined as the A/P ratio, it can be seen that the A/P ratio is constant regardless of the sample concentration in the regions of the concentrations $C_1$ to $C_3$.

<Example of Deteriorated Waveform>

FIG. 5 is a diagram showing an example of a waveform in a case in which the detector 103 deteriorates. When the detector 103 deteriorates, for example, the gain of the electron multiplier tube decreases, or the efficiency of converting ions of the scintillator into photons decreases. Therefore, as shown in B of FIG. 5, the intensity of the electric signal in the case in which the detector 103 deteriorates is weaker and the pulse area is smaller as compared with the electric signal (FIG. 5A) detected by the detector 103 in a non-deteriorated state. Although a pulse area after the deterioration is small, it can also be seen that the number of electric signals itself exceeding the threshold value of the pulse count is the same as that before the deterioration.

<Relationship Between Measured Value and A/P Ratio>

FIG. 6 is a table showing a relationship between the measured value and the A/P ratio when the sample having the concentration C is measured. In FIG. 6, in the pulse count method, the number of pulses is used as a measured value. In the analog method, the measured value is calculated assuming that the pulse area (reference area) per ion is "100".

A result of No. 1 shows an example of a case in which the detector 103 does not deteriorate and other parts of the mass analysis device 104 are not contaminated. In No. 1, both the measured value according to the pulse count method and the measured value according to the analog method are "2", and the A/P ratio is "1".

The result of No. 2 shows an example of a case in which the detector 103 deteriorates and there is no contamination in a part other than the detector 103. In this case, the measured value according to the pulse count method is "2", which is the same as that of No. 1. On the other hand, since the pulse area corresponding to one ion decreases due to the deterioration of the detector 103, the measured value according to the analog method decreases to "1". Therefore, the A/P ratio decreases to 0.5.

The result of No. 3 shows an example of a case in which the detector 103 does not deteriorate and there is contamination in the part other than the detector 103. In this case, since the frequency at which the ions reach the detector 103 decreases, the measured value according to the pulse count method is "1". On the other hand, in the analog method, since the pulse area corresponding to one ion does not change, the measured value is "1", which is the same as that in the pulse count method. Therefore, the A/P ratio is "1", which is the same value as that of No. 1. However, since the number of pulses is smaller than the result (the previous result in time series: for example, an initial value) of No. 1, it can be determined that there is contamination (contamination of the device) in a part other than the detector 103.

The result of No. 4 shows an example of a case in which the detector 103 deteriorates and there is contamination in the part other than the detector 103. Similar as in No. 3, in this case, since the frequency at which the ions reach the detector 103 decreases, the measured value according to the pulse count method is "1". On the other hand, in the analog method, since the pulse area corresponding to one ion is reduced, the measured value is "0.5". In this case, the A/P ratio is "0.5". Further, since the number of pulses is smaller than the result (the previous result in time series: for example, the initial value) of No. 1, it can be determined that there is also contamination (contamination of the device) in a part other than the detector 103.

As described above, the A/P ratio is a value with which the performance of the detector 103 can be determined regardless of the presence or absence of the contamination in the part other than the detector 103. Therefore, by monitoring the A/P ratio, whether the detector 103 has deteriorated can be accurately determined. Since the measurement of the A/P ratio does not involve a complicated operation of removing the detector 103 from the mass analysis device 104, the performance of the detector 103 can be quickly determined.

In the configuration example shown in FIG. 1, the calculation unit 107 has a function of calculating the A/P ratio, and the determination unit 108 has a function of determining the performance of the detector 103. The calculation unit 107 and the determination unit 108 may be electrical processing on a circuit board or software processing using a program together with the control unit (controller) 109. That is, a processor (for example, a CPU) (not illustrated) may read a program from a memory (not illustrated) and load the program to implement the calculation unit 107 and the determination unit 108. For example, a graphical user interface (GUI) may include the calculation unit 107 and the determination unit 108 as a part of the functions.

The control unit (controller) 109 controls operations of the mass analysis device 104, the analog calculation unit (first converter) 105, the pulse counting unit (second converter) 106, the calculation unit 107, and the determination unit 108. The control unit (controller) 109 may be provided in, for example, a GUI.

<Performance Determination Processing of Detector>

FIG. 7 is an example of a flowchart showing the processing of determining the performance (presence or absence of the deterioration) of the detector 103 in the mass analysis system 10 in FIG. 2. The performance determination processing of the detector 103 can be executed at any timing. For example, the timing may be a timing of executing a mass calibration or a timing before cleaning of the device. Here, the mass calibration is an operation of correcting a relationship between a value of the electrical and magnetic action applied to the device and the mass-to-charge ratio. In general, since a measurement sample having a high sample concentration is used, the measurement sample can also be used for the measurement of the A/P ratio. The mass calibration is an operation periodically executed such as once every several months and once every year. When the A/P ratio is measured every time the mass calibration is executed, a temporal change in the state of the detector 103 can be grasped without taking time and effort. The cleaning of the device is also an operation that is periodically performed in the same manner as the mass calibration. If the A/P ratio is measured before the cleaning of the device, the detector 103 can be replaced at the same time as the cleaning of the device when the detector 103 has deteriorated. Hereinafter, the detector performance determination processing will be described with reference to the flowchart.

(i) Step 701

After performance checking of the detector 103 is started, the sample is measured according to the analog method and the pulse count method. That is, the analog calculation unit (first converter) 105 obtains an area (an example) of an electric signal obtained by the detector 103 (see FIG. 2), and divides the area by a reference area to calculate a measured value according to the analog method. On the other hand, the pulse counting unit (second converter) 106 calculates a measured value according to the pulse count method based on a predetermined threshold value (threshold value of the pulse count: see FIG. 3). As the sample, a sample corresponding to a range of the sample concentrations $C_1$ to $C_3$ in FIG. 5 is preferably used.

Each measurement in step 701 may be executed by simultaneously executing the analog method and the pulse count method, or may be executed individually. When the measurement is executed individually, a physical switch may be provided in the circuit to switch the measurement method, or a method may be used in which the measurement method can be selected by software. In the case of selecting the measurement method by software, the control unit (controller) 109 may have a function of selecting the measurement method. The measurement may be executed in a short cycle of nanosecond to second units, or may be executed in a long cycle of several tens of seconds to several minutes. The measurement may be repeated a plurality of times.

(ii) Step 702

The calculation unit 107 calculates the A/P ratio (=measured value according to the analog method/measured value according to the pulse count method) based on the results (measured value) according to the two methods obtained in step 701. When there are a plurality of data points obtained by the measurement according to the methods, the A/P ratio may be calculated as an average value, for example.

(iii) Step 703

The determination unit 108 compares the A/P ratio calculated in step 702 with a predetermined reference range (acceptable range) of the A/P ratio, and determines whether the A/P ratio is a value within the reference range. When the A/P ratio is a value within the reference range (Yes in step 703), the processing proceeds to step 704. When the A/P ratio is out of the reference range (No in step 703), the processing proceeds to step 705.

A determination criterion of the A/P ratio in step 703 can be determined in a state in which the detector 103 is new. The A/P ratio when the detector 103 is new is set to $[A/P]_0$, the processing according to the flowchart in FIG. 7 is executed time t from the start of use of the detector 103, and the A/P ratio at that time is set to $[A/P]_t$. As the reference range, for example, a difference and a ratio with respect to $[A/P]_0$, and a change rate from $[A/P]_0$, such as $[A/P]_t-[A/P]_0$, $[A/P]_t/[A/P]_0$, and $([A/P]_t-[A/P]_0)/\Delta t$, may be determined. The reference range may be a difference, a ratio, a change rate, and the like with respect to the previous measured value. The reference range may be a change rate with respect to the cumulative number of ions measured by the device up to that point and the like.

That is, since the A/P ratio decreases (becomes smaller than 1) when the deterioration of the detector 103 starts, for example, whether the detector 103 is acceptable can be determined based on whether the value of the AP ratio is larger than a variation σ value (for example, 0.95). Whether the detector 103 is acceptable may be determined based on whether the change rate of the A/P ratio, that is, the value (that is, the slope) of $([A/P]_t-[A/P]_0)/\Delta t$ is larger than a predetermined set value. When a deviation of the A/P ratio is small but the change rate (slope) is large, it may be determined early that the detector 103 is unacceptable.

(iv) Step 704

The determination unit 108 determines that the deterioration of the target detector 103 has not progressed, and determines that the detector 103 is acceptable.

(v) Step 705

The determination unit 108 determines that the deterioration of the target detector 103 exceeds an allowable range and the detector 103 is unacceptable.

When it is determined in step 705 that the performance of the detector 103 is unacceptable, the control unit (controller) 109 may execute maintenance processing of the detector 103. For example, the gain may be adjusted by adjusting the voltage applied to the multiplier tube, and the apparent performance of the detector 103 may be recovered. The processing of adjusting the gain may be automatically instructed and executed by the control unit (controller) 109 (for example, the user sets an adjustment value in advance, and the gain adjustment is automatically executed using an unacceptable result as a trigger).

A warning alarm may be displayed on the GUI, or a message such as "please replace the detector" may be displayed.

<GUI Configuration Example>

The results of steps 710, 702, and 703 to 705 may be displayed on the GUI screen so that the user of the mass analysis device 104 can grasp the state of the detector 103. FIG. 8 is a diagram showing an example of a GUI result display screen.

The GUI screen generally includes a region for displaying a visual measurement result such as a measurement condition of a sample, a mass spectrum, or a mass chromatogram, and a region for displaying a numerical measurement result such as peak information (a center position of a peak, a half-value width, an intensity, and the like) of a spectrum or a chromatogram. For example, if information on the A/P ratio is displayed in a numerical measurement result column, a state of the detector 103 can be easily transmitted to the user. For example, there may be a screen that displays a measurement result of the A/P ratio, such as a graph that shows a change in the A/P ratio with respect to the time or the measured cumulative number of ions.

<Overview of First Embodiment>

According to the first embodiment, the A/P ratio is calculated based on the measured value according to the analog method and the measured value according to the pulse count method, and whether the detector 103 is acceptable is determined based on the calculated value. In this way, the presence or absence of performance deterioration in the detector 103 alone can be determined without being influenced by the presence or absence of contamination in the part other than the detector.

(2) Second Embodiment

A second embodiment relates to a mass analysis system that executes processing of determining contamination of the mass analysis device 104 at the same time as measurement (performance determination processing of the detector 103) of the A/P ratio. The configuration of the mass analysis system 10 according to the first embodiment can also be applied to the second embodiment.

<Performance Determination Processing of Mass Analysis Device>

FIG. 9 is an example of a flowchart showing performance determination processing (performance checking processing) of the mass analysis device according to the second embodiment. Here, in addition to the acceptable and unacceptable determination of the detector 103, determination processing of contamination (performance deterioration) of the part other than the detector 103 is included. The acceptable and unacceptable determination of the detector 103 is similar as that in the first embodiment (steps 701 to 705 in FIG. 7). That is, after the performance checking of the mass analysis device 104 is started, any sample is measured (step 701), and the A/P ratio is calculated by the calculation unit 107 (step 702). Then, the determination unit 108 determines the performance of the detector 103 (steps 703 to 705).

In the second embodiment, in parallel with the processing in steps 702 to 705, determination processing of the presence or absence of contamination of the mass analysis device 104 is executed based on the measured value (step 901). After the determination, the performance checking of the mass analysis device 104 ends.

Step 901 is processing of determining contamination of devices other than the detector 103 based on the data measured in step 701. The presence or absence of the contamination (the presence or absence of performance deterioration in the part other than the detector 103) is determined based on the measured value instead of the A/P ratio. For example, under the control of the control unit (controller) 109, the determination unit 108 compares past measured values measured under the same type, concentration, and the same measurement conditions with the measurement result (measured value) in step 701. The comparison may be executed using a measured value according to the pulse count method that is not affected by the deterioration of the detector 103. The measured value according to the analog method may be corrected using the A/P ratio measured in the past and compared. As a result of the above-described comparison, when the measured value has a decreasing tendency (for example, how much the measured value decreases from the initial measured value: the determination can be executed based on whether the decrease value exceeds a predetermined threshold value), or when the measured value is out of the freely determined reference range (for example, it can be determined whether a temporal change rate of the measured value exceeds a predetermined value), it is determined that the mass analysis device 104 is contaminated (there is performance deterioration in the mass analysis device 104). The control unit 109 may display the determination result on the display screen (GUI screen) of the display device 110 similarly to the A/P ratio.

Such performance determination processing (FIG. 9) of the mass analysis device 104 can be executed, for example, at a timing of mass calibration. In general, the sample used for the mass calibration, the concentration, and the measurement conditions thereof are always the same. Therefore, at the time of mass calibration, it is easy to determine both the performance of the detector 103 and the contamination of the mass analysis device 104.

<Overview of Second Embodiment>

According to the second embodiment, for example, the performance determination of the detector 103 based on the A/P ratio and the processing of comparing the measured value according to the pulse count method in time series are executed, whereby the contamination of the mass analysis device 104 can be checked simultaneously with the performance of the detector 103, and a plurality of defect factors can be checked in a short time.

(3) Third Embodiment

A third embodiment relates to a mass analysis system in which the determination unit 108 determines the performance (deterioration state) of the detector in accordance with a plurality of determination criteria. The configuration of the mass analysis system 10 according to the first embodiment can also be applied to the second embodiment.

<Performance Determination Processing of Detector>

FIG. 10 is an example of a flowchart showing performance determination processing (performance checking processing) of the detector 103 according to the third embodiment.

(i) Step 1001

After the performance checking of the detector 103 is started, the sample is measured according to the analog method and the pulse count method. That is, the analog calculation unit (first converter) 105 obtains the area (an example) of the electric signal obtained by the detector 103 (see FIG. 2), and divides the area by the reference area to calculate the measured value according to the analog method. On the other hand, the pulse counting unit (second converter) 106 calculates the measured value according to the pulse count method based on the predetermined threshold value (threshold value of the pulse count: see FIG. 3). As the sample, a sample corresponding to the range of the sample concentrations $C_1$ to $C_3$ in FIG. 5 is preferably used.

Similar to step 701 (see FIG. 7), each measurement in step 1001 may be executed by simultaneously executing the analog method and the pulse count method, or may be executed individually. When the measurement is executed individually, a physical switch may be provided in a circuit to switch the measurement method, or the method in which the measurement method can be selected by software may be used. In the case of selecting the measurement method by software, the control unit (controller) 109 may have the function of selecting the measurement method. The measurement may be executed in the short cycle of nanosecond to second units, or may be executed in the long cycle of several tens of seconds to several minutes. The measurement may be repeated a plurality of times.

(ii) Step 1002

The calculation unit 107 calculates the A/P ratio (=measured value according to the analog method/measured value according to the pulse count method) based on the results (measured value) according to the two methods obtained in step 701. When there are a plurality of data points obtained by the measurement according to the methods, the A/P ratio may be calculated as the average value, for example.

(iii) Step 1003

The determination unit 108 determines whether the value of the A/P ratio calculated in step 1002 is equal to or greater than an acceptable reference value (first reference value) set in advance (or "whether the value of the A/P ratio is greater than the first reference value"). As described above, when the deterioration of the detector 103 starts, the measured value according to the analog method starts to decrease, and thus the value of the A/P ratio is smaller than 1. Therefore, the acceptable reference value is set to, for example, 0.9, and it is determined whether there is no problem even if the detector 103 is continuously used in the future. When the value of the A/P ratio is equal to or greater than the acceptable reference value (greater than the acceptable reference value) (Yes in step 1003), the processing proceeds to step 1004. When the value of the A/P ratio is smaller than the acceptable reference value (equal to or smaller than the acceptable reference value) (No in step 1003), the processing proceeds to step 1005.

(iv) Step 1004

The determination unit 108 determines that the deterioration of the performance of the detector 103 to be determined has not progressed and is acceptable (there is no problem even if the detector 103 is continuously used). Then, the control unit (controller) 109 outputs information of the determination result to the display device 110 so as to display "continuous use of the detector is OK" on the GUI screen, for example.

Although the value of the A/P ratio is equal to or greater than the acceptance reference value, when the change rate (difference from the previous value/time) of the A/P ratio is equal to or greater than a predetermined value, a message may be output on the GUI screen so as to call attention to the possibility that the performance deterioration of the detector may be detected in the next and subsequent performance determination processing although the detector 103 is acceptable in the current performance determination.

(v) Step 1005

The determination unit 108 determines whether the value of the A/P ratio calculated in step 1002 is equal to or smaller than an unacceptable reference value (second reference value) set in advance (or "whether the value of the A/P ratio is smaller than the second reference value"). Here, the unacceptable reference value (second reference value) is a value larger than the acceptable reference value (first reference value). That is, in the third embodiment, it is determined, based on two criteria (or three or more criteria), whether the A/P ratio is within a range of acceptable, a range of unacceptable, or a range between unacceptable and acceptable. When the value of the A/P ratio is equal to or smaller than the unacceptable reference value (smaller than the unacceptable reference value) (No in step 1005), the processing proceeds to step 1006. When the value of the A/P ratio is larger than the unacceptable reference value (equal to or larger than the unacceptable reference value) (Yes in step 1005), the processing proceeds to step 1007.

(vi) Step 1006

The determination unit 108 determines that the target detector 103 cannot be continuously used as it is but the deterioration has not progressed until the target detector 103 is replaced (determines that the target detector 103 is in the range between unacceptable and acceptable). Then, the control unit (controller) 109 outputs information of the determination result to the display device 110 so as to display "deterioration of the detector is progressing" on the GUI screen, for example.

In this case, the function of the detector 103 can be recovered by adjusting the voltage applied to the detector 103 instead of replacing the detector 103 (maintenance of the detector 103). The value of the applied voltage at the time of the adjustment may be set in advance.

(vii) Step 1007

The determination unit 108 determines that the target detector 103 cannot be continuously used as it is and the deterioration has progressed to a state of requiring replacement (determines that the target detector 103 is unacceptable). Then, the control unit (controller) 109 outputs information of the determination result to the display device 110 so as to display "detector replacement is required" on the GUI screen, for example.

As described above, the determination criteria (the acceptable reference value and the unacceptable reference value) can be set using one or more of a difference from an initial value or a previous measured value of the A/P ratio, a ratio, a change rate with respect to time, a change rate with respect to the cumulative number of the measured ions, and the like.

<Overview of Third Embodiment>

According to the third embodiment, a plurality of determination criteria are provided, and the performance deterioration of the detector 103 is determined in stages based on the determination results corresponding to the determination criteria. In this way, the state of the detector 103 can be known in more detail. For example, in the example in FIG. 10, when it is determined that the detector deterioration is progressing, there is a time margin for providing a tool or a component necessary for maintenance of the detector 103.

When three or more criteria are provided, it is possible to implement further subdivided performance determination as a case in which the deterioration of the detector 103 is still light, and a case in which the deterioration of the detector 103 has considerably progressed although the unacceptance (replacement of the detector 103) does not occur.

(4) Fourth Embodiment

A fourth embodiment relates to a mass analysis system that calculates an A/P ratio and accumulates the A/P ratio as information (executes A/P ratio and measured value collection processing) during any measurement. Here, any measurement means that the mass analysis system may calculate and accumulate the A/P ratio when LC-MS measurement and GC-MS measurement are executed in combination with a liquid chromatograph or a gas chromatograph, or when mass calibration is executed, for example. The configuration of the mass analysis system 10 according to the first embodiment can also be applied to the second embodiment.

<Details of A/P Ratio and Measured Value Collection Processing>

FIG. 11 is an example of a flowchart showing the A/P ratio and measured value collection processing according to the fourth embodiment.

(i) Step 1101

After the performance checking of the detector 103 is started, the sample is measured according to the analog method and the pulse count method. That is, the analog calculation unit (first converter) 105 obtains the area (an example) of the electric signal obtained by the detector 103 (see FIG. 2), and divides the area by the reference area to calculate the measured value according to the analog method. On the other hand, the pulse counting unit (second converter) 106 calculates the measured value according to the pulse count method based on the predetermined threshold value (threshold value of the pulse count: see FIG. 3). As the sample, the sample corresponding to the range of the sample concentrations C1 to C3 in FIG. 5 is preferably used.

Similar to step 701 (see FIG. 7), each measurement in step 1101 may be executed by simultaneously executing the analog method and the pulse count method, or may be executed individually. When the measurement is executed individually, the physical switch may be provided in the circuit to switch the measurement method, or the method may be used in which the measurement method can be selected by software. In the case of selecting the measurement method by software, the control unit (controller) 109 may have the function of selecting the measurement method. The measurement may be executed in the short cycle of nanosecond to second units, or may be executed in the long cycle of several tens of seconds to several minutes. The measurement may be repeated a plurality of times.

(ii) Step 1102

The determination unit 108 determines whether any one of the measured values according to the analog method and the pulse count method is equal to or greater than a predetermined threshold value (or "whether any one of the measured values is greater than the threshold value"). The threshold value at this time can be set to any value within the range corresponding to the sample concentrations $C_1$ to $C_3$. When the measured value obtained in step 1101 is equal to or greater than any threshold value (greater than the threshold value) (Yes in step 1102), the processing proceeds to step 1104. When the measured value is less than any threshold value (equal to or less than the threshold value) (No in step 1102), the processing proceeds to step 1103.

Any threshold value can be set corresponding to each of the analog method and the pulse count method. For example, in the case of mass calibration, the threshold value is a reference (for example, a measured value corresponding to the concentration $C_1$ in FIG. 4 can be used) for removing a measured value that is not appropriate as a target for which the A/P ratio is to be calculated since ions are not sufficiently emitted.

(iii) Step 1103

The control unit (controller) 109 stores only the measured value acquired in step 1101 in a storage device (not shown) such as a memory or a storage device. The measured value to be stored may be a measured value according to either an analog method or a pulse count method. In step 1102, the measured value less than (equal to or less than) any threshold value is not discarded, and is stored as information of fluctuation (noise) when ions are not emitted or when only a small amount of ions are emitted, which is not suitable for calculation of the A/P ratio. Since it is also important in the experiment to know a relationship between a fluctuation level and a measured peak value, a measured value less than (equal to or less than) any threshold value is also stored.

(iv) Step 1104

The calculation unit 107 calculates the A/P ratio (=measured value according to the analog method/measured value according to the pulse count method) based on the results (measured value) according to the two methods obtained in step 1101. When there are a plurality of data points obtained by the measurement according to each method, the A/P ratio may be calculated as the average value, for example.

(v) Step 1105

The determination unit 108 determines the performance (presence or absence of deterioration) of the detector 103 based on the value of the A/P ratio calculated in step 1104. In the determination processing, for example, as described in the third embodiment, a plurality of determination criteria may be provided. Details of the determination criteria have already been described in the first to third embodiments, and thus will be omitted here.

When the A/P ratio is a value within the reference range (Yes in step 1105), the processing proceeds to step 1106. When the A/P ratio is a value out of the reference range (No in step 1105), the processing proceeds to step 1107.

(vi) Step 1106

The determination unit 108 determines that the detector 103 in use is continuously usable (acceptable) as it is.

(vii) Step 1107

The determination unit 108 determines that the detector 103 in use cannot be continuously used as it is and the deterioration has progressed to the state of requiring replacement (determines that the target detector 103 is unacceptable).

(viii) Step 1108

After the acceptable and unacceptable determination of the detector 103, the control unit (controller) 109 stores the measured value according to any method (analog method or pulse count method) and the A/P ratio. If the A/P ratio and the measured value according to one of the methods are held, the measured value according to the other method that is not held can be obtained by calculation. The data stored in this manner can be used to investigate the cause of performance deterioration of the detector 103 during maintenance.

<Overview of Fourth Embodiment>

According to the fourth embodiment, when the A/P ratio is calculated during any measurement, data of the A/P ratio is accumulated every time the mass analysis device 104 is used without intentionally checking the performance of the detector 103. When the signal of the sample can be measured only for several seconds, such as LC-MS or GC-MS measurement, adjustment can be executed by the processing 1102 such that the A/P ratio is calculated only based on the data for several seconds in which the sample has arrived. Therefore, the performance of the detector 103 can be determined only based on highly reliable A/P ratio data. Since the number of pieces of data of the A/P ratio increases, the value, tendency, and the like of the A/P ratio can be determined more accurately for statistical reasons. Further, a tendency of an intra-day change and inter-day change of the A/P ratio can also be grasped.

<Modification>

Functions according to the present embodiment can be implemented by a program cord of software. In this case, a storage medium recording a program code is provided to the system or the device, and a computer (or CPU or MPU that may be referred to as a processor) of the system or the device reads the program code stored in the storage medium. In this case, the program code itself read from the storage medium implements the above-described functions according to the embodiments, and the program code itself and the storage medium storing the program code constitute the present embodiment. As the storage medium to supply such a program code, for example, a flexible disk, a CD-ROM, a DVD-ROM, a hard disk, an optical disk, a magneto-optical disk, a CD-R, a magnetic tape, a nonvolatile memory card, or a ROM is used.

An operating system (OS) or the like running on the computer may execute a part or all of actual processing based on an instruction of the program code, and the above-described functions according to the embodiments may be implemented by the processing. After the program code read from the storage medium is written in a memory of the computer, the CPU or the like of the computer may execute a part or all of the actual processing based on the instruction of the program code, and the above-described functions according to the embodiments may be implemented by the processing.

Further, by distributing the program code of software for implementation of the functions according to the embodiments via a network, the program cord may be stored in a storage device such as a hard disk or a memory of the system or the device or in a storage medium such as a CD-RW or a CD-R, and may be executed by reading the program cord stored in the storage device or the storage medium by the computer (or the CPU or the MPU) of the system or the device during usage.

Processing and a technique described herein are not inherently relevant to any particular device and may be implemented by any suitable combination of components. Further, various types of devices for general purpose may be used in accordance with teachings described herein. It may be appreciated that it is beneficial to construct a specialized device to execute the steps according to the method described herein. Various inventions can be formed by appropriately combining a plurality of the constituent elements disclosed in the embodiments. For example, some constituent elements may be deleted from all the constituent elements disclosed in the embodiments. Further, the components in different embodiments may be appropriately combined. As described above, the present disclosure has been described with reference to specific examples, which are for illustrative purposes only and not for purposes of limitation. Those skilled in the art will recognize that there are numerous combinations of hardware, software, and firmware that are suitable for practicing the present disclosure. For example, described software can be implemented in a wide range of programs or scripting languages such as an assembler, C/C++, perl, Shell, PHP, and Java (registered trademark).

In the embodiments described above, a control line and an information line are considered to be necessary for description, and all control lines and all information lines are not necessarily shown in a product. All of the configurations may be connected to one another.

The technical idea of the present disclosure is not limited to the above-described embodiments, and includes various modifications. For example, the above-described embodiments have been described in detail for easy understanding of the present disclosure, and the present disclosure is not necessarily limited to that including all the configurations described above. A part of a configuration according to an embodiment may be replaced with a configuration according to another embodiment, or the configuration according to an embodiment may be added to the configuration according to another embodiment. A part of the configuration according to each embodiment may be added to, deleted from, or replaced with another configuration.

A part or all of the above-described configurations, functions, processing units, processing methods, and the like may be implemented by hardware, for example, by being designed using an integrated circuit.

REFERENCE SIGN LIST 10 mass analysis system
101 ion source
102 mass analysis unit
103 detector
104 mass analysis device
105 analog calculation unit (first converter)
106 pulse counting unit (second converter)
107 calculation unit
108 determination unit
109 control unit (controller)

The invention claimed is:

1. A mass analysis system, comprising:
an ion source configured to ionize a measurement sample,
a detector configured to generate an electrical signal in response to detecting ions from the measurement sample;
an analog calculation unit configured to calculate a first measured value based on an intensity and an area of a pulse in the electric signal generated by the detector;

a pulse counting unit configured to obtain a second measured value by counting a number of pulses of the electric signal generated by the detector; and a processor that is communicatively coupled to the analog calculation unit and the pulse counting unit, wherein the processor is configured to:

receive the first measured value from the analog calculation unit, receive the second measured value from the pulse counting unit, calculate an A/P ratio indicating a ratio of the first measured value to the second measured value, perform a comparison of the A/P ratio with a threshold, determine that the detector has deteriorated and is no longer acceptable based on the comparison, and determine that another component of the mass analysis system is contaminated by applying the A/P ratio to the first measured value to produce an adjusted value and comparing the adjusted value to the second measured value, wherein the another component is different from the detector.

2. The mass analysis system according to claim 1, wherein the detector includes a scintillator configured to convert the ions into photons; and a photoelectron multiplier tube configured to convert photons emitted from the scintillator into electrons and to amplify the electrons.

3. The mass analysis system according to claim 1, wherein the detector includes an electron multiplier tube configured to amplify the ions.

4. The mass analysis system according to claim 1, wherein the A/P ratio is calculated using a time average value of the first measured value and the second measured value.

5. The mass analysis system according to claim 1, wherein the comparison is further based on at least one of an initial value of the A/P ratio, a difference between a previous A/P ratio and a current A/P ratio, a ratio between the previous A/P ratio and the current A/P ratio, or a change rate between the previous A/P ratio and the current A/P ratio.

6. The mass analysis system according to claim 1, wherein the processor is further configured to:

display a warning alarm or a message on a graphic user interface (GUI) screen of a display device when either the detector has deteriorated or the mass analysis system is contaminated.

7. The mass analysis system according to claim 1, wherein the processor is further configured to adjust a gain of the detector based on the comparison.

8. The mass analysis system according to claim 1, wherein the processor is further configured to:

store the A/P ratio and at least one of the first measured value or the second measured value in a memory.

9. A method for evaluating a deterioration of a detector included in mass analysis system, the method comprising:

generating, by the detector, an electrical signal based on ions from a measurement sample;

calculating, by a first converter, a first measured value based on an intensity and an area of a pulse in the electric signal generated by the detector;

obtaining, by a second converter, a second measured value by counting a number of pulses of the electric signal generated by the detector;

calculating, by a processor, an A/P ratio indicating a ratio of the first measured value to the second measured value;

performing, by the processor, a comparison of the A/P ratio with a threshold;

determining, by the processor, that the detector has deteriorated and is no longer acceptable based on the comparison; and determining, by the processor, that another component of the mass analysis system is contaminated by applying the A/P ratio to the first measured value to generate an adjusted value and comparing the adjusted value to the second measured value, wherein the another component is different from the detector.

* * * * *